(12) United States Patent
Wambugu Ngahu et al.

(10) Patent No.: US 10,872,722 B2
(45) Date of Patent: Dec. 22, 2020

(54) SHIELD MEMBER AND POWER TRANSMISSION UNIT

(71) Applicant: Yazaki Corporation, Tokyo (JP)

(72) Inventors: Antony Wambugu Ngahu, Shizuoka (JP); Takashi Shiroki, Shizuoka (JP); Takahiro Nakahara, Shizuoka (JP); Ryohei Nishizaki, Shizuoka (JP); Takayuki Ueda, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 28 days.

(21) Appl. No.: 15/992,310

(22) Filed: May 30, 2018

(65) Prior Publication Data
US 2018/0366264 A1 Dec. 20, 2018

(30) Foreign Application Priority Data
Jun. 14, 2017 (JP) .................. 2017-116851

(51) Int. Cl.
| | | |
|---|---|---|
| H01F 27/36 | (2006.01) | |
| H01F 38/14 | (2006.01) | |
| H01F 27/28 | (2006.01) | |
| H02J 50/70 | (2016.01) | |
| H02J 50/12 | (2016.01) | |
| H02J 50/10 | (2016.01) | |
| H02J 7/02 | (2016.01) | |

(52) U.S. Cl.
CPC .......... *H01F 27/36* (2013.01); *H01F 27/288* (2013.01); *H01F 38/14* (2013.01); *H02J 50/10* (2016.02); *H02J 50/12* (2016.02); *H02J 50/70* (2016.02); *H01F 27/2871* (2013.01); *H02J 7/025* (2013.01)

(58) Field of Classification Search
CPC ........ H01F 27/365; H01F 38/14; H02J 50/12; H02J 7/025
USPC ......................................................... 307/104
See application file for complete search history.

(56) References Cited

U.S. PATENT DOCUMENTS

| | | | |
|---|---|---|---|
| 2015/0136499 A1* | 5/2015 | Ichikawa .............. | B60L 53/126 180/54.1 |
| 2015/0244181 A1* | 8/2015 | Kagami .................. | H01F 27/36 307/104 |
| 2016/0072167 A1* | 3/2016 | Kawai ................... | H01P 1/2013 333/24 R |
| 2016/0114687 A1* | 4/2016 | Ichikawa .............. | B60L 53/122 701/22 |
| 2017/0103850 A1* | 4/2017 | Furiya ..................... | H01F 21/10 |
| 2018/0137970 A1* | 5/2018 | Doi ......................... | H02J 7/025 |
| 2018/0174747 A1* | 6/2018 | Hirobe .................. | H01Q 1/521 |

FOREIGN PATENT DOCUMENTS

| | | |
|---|---|---|
| EP | 3 041 007 A1 | 7/2016 |
| JP | 2014-113021 A | 6/2014 |

* cited by examiner

*Primary Examiner* — Alfonso Perez Borroto
(74) *Attorney, Agent, or Firm* — Sughrue Mion, PLLC

(57) ABSTRACT

A shield member and a power transmission unit each include a shielding wall formed annularly about an axis so as to surround a power transmission coil at a position extending along an intersecting direction. The shielding wall shields a magnetic force generated by the power transmission coil. The shielding wall is formed such that a distance between wall faces facing each other in the intersecting direction is wider at a longer distance from a first side toward a second side in an axial direction.

8 Claims, 10 Drawing Sheets

|  | COMPARATIVE EXAMPLE | EMBODIMENT |
|---|---|---|
| SHIELDING LOSS [W] | 7.11 | 1.24 |
| MAGNETIC FIELD@100 mm [A/m] (ORTHOGONAL DIRECTION) | 0.79 | 0.40 |
| MAGNETIC FIELD@100 mm [A/m] (AXIAL DIRECTION) | 0.96 | 0.55 |
| INDUCTANCE L [$\mu$H] PAIR | 4.06 | 4.87 |
| RESISTANCE R [$\mu\Omega$] PAIR | 34.91 | 15.79 |
| Q PAIR | 72.99 | 193.59 |
| COUPLING COEFFICIENT k | 0.457 | 0.562 |

FIG.13

| | MODIFICATION |
|---|---|
| SHIELDING LOSS [W] | 1.19 |
| MAGNETIC FIELD@100 mm [A/m] (ORTHOGONAL DIRECTION) | 0.56 |
| MAGNETIC FIELD@100 mm [A/m] (AXIAL DIRECTION) | 0.90 |
| INDUCTANCE L [$\mu$H] PAIR | 4.80 |
| RESISTANCE R [$\mu\Omega$] PAIR | 15.66 |
| Q PAIR | 192.49 |
| COUPLING COEFFICIENT k | 0.556 |

SHIELD MEMBER AND POWER TRANSMISSION UNIT

CROSS-REFERENCE TO RELATED APPLICATION(S)

The present application claims priority to and incorporates by reference the entire contents of Japanese Patent Application No. 2017-116851 filed in Japan on Jun. 14, 2017.

BACKGROUND OF THE INVENTION

1. Field of the Invention

The present invention relates to a shield member and a power transmission unit.

2. Description of the Related Art

A known power transmission unit transmits electric power in a non-contact manner. For example, the power transmission unit includes a power transmission coil that transmits electric power and a shield member that shields a leakage magnetic field generated by the power transmission coil (see, for example, Japanese Patent Application Laid-open No. 2014-113021).

In the known power transmission unit, an eddy current that cancels a magnetic field of the power transmission coil can flow through the shield member. The flow of the eddy current may hamper transmission of electric power by the power transmission unit. Still further improvements need to be made in this respect.

SUMMARY OF THE INVENTION

The present invention has been made in view of the foregoing situation and it is an object of the present invention to provide a shield member and a power transmission unit capable of preventing reduction in power transmission efficiency.

In order to achieve the above mentioned object, a shield member according to one aspect of the present invention includes a shielding wall that is formed annularly about an axis, and shields a magnetic force generated by a power transmission coil disposed inside the shielding wall, wherein the shielding wall is formed such that a distance between wall faces facing each other in an intersecting direction that intersects the axis is wider at a longer distance from a first side in toward a second side in an axial direction extending along the axis.

According to another aspect of the present invention, in the shield member, it is possible to configure that the shielding wall is formed to have an arcuate cross-sectional shape along the axial direction.

According to still another aspect of the present invention, in the shield member, it is possible to configure that the shielding wall is formed to have a rectangular cross-sectional shape along the axial direction.

In order to achieve the above mentioned object, a power transmission unit according to still another aspect of the present invention includes a power transmission coil that transmits electric power to a counterpart side power transmission coil in a non-contact manner; and a shield member that includes a shielding wall that is formed annularly about an axis, and shields a magnetic force generated by a power transmission coil disposed inside the shielding wall, wherein the shielding wall is formed such that a distance between wall faces facing each other in an intersecting direction that intersects the axis is wider toward the counterpart side power transmission coil.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a chart depicting shielding performance of the shield member in the modification.

DETAILED DESCRIPTION OF THE PREFERRED EMBODIMENTS

The following details, with reference to the accompanying drawings, an embodiment for carrying out the invention. The following descriptions depict only an exemplary embodiment and are not to be considered limiting. The elements described hereunder include those that can be easily conceived by those skilled in the art and those that are substantially identical to each other. Furthermore, the configurations described hereunder may be combined with each other as appropriate. Various omissions, substitutions, and changes in the form of the configurations described herein may be made without departing from the spirit of the invention.

Embodiment

The following describes a power transmission unit 1 according to an embodiment. The power transmission unit 1 transmits electric power in a non-contact manner and communicates signals wirelessly. The power transmission unit 1 functions on a power transmission side on which electric power is transmitted or on a power reception side on which the electric power is received. The power transmission unit 1 may be used, for example, for charging a storage battery disposed on a vehicle not illustrated. In this case, the power transmission unit 1 on the power reception side may, for example, be disposed on a bottom face of the vehicle and connected with the storage battery of the vehicle. The power transmission unit 1 on the power transmission side may, for example, be disposed on the ground of a charging station not illustrated and connected with a power source. The power transmission unit 1 on the power transmission side, under a condition in which the power transmission unit 1 on the power transmission side faces the power transmission unit 1 on the power reception side, transmits electric power supplied from the power source to the power transmission unit 1 on the power reception side by, for example, magnetic resonance. The power transmission unit 1 on the power reception side receives the electric power transmitted from the power transmission unit 1 on the power transmission side and outputs the received electric power to the storage battery of the vehicle. The power transmission unit 1 on the power transmission side and the power transmission unit 1 on the power reception side share an identical major configuration and the following descriptions of the power transmission unit 1 are applicable to both the power transmission unit 1 on the power transmission side and the power transmission unit 1 on the power reception side unless otherwise noted.

Figure 1:
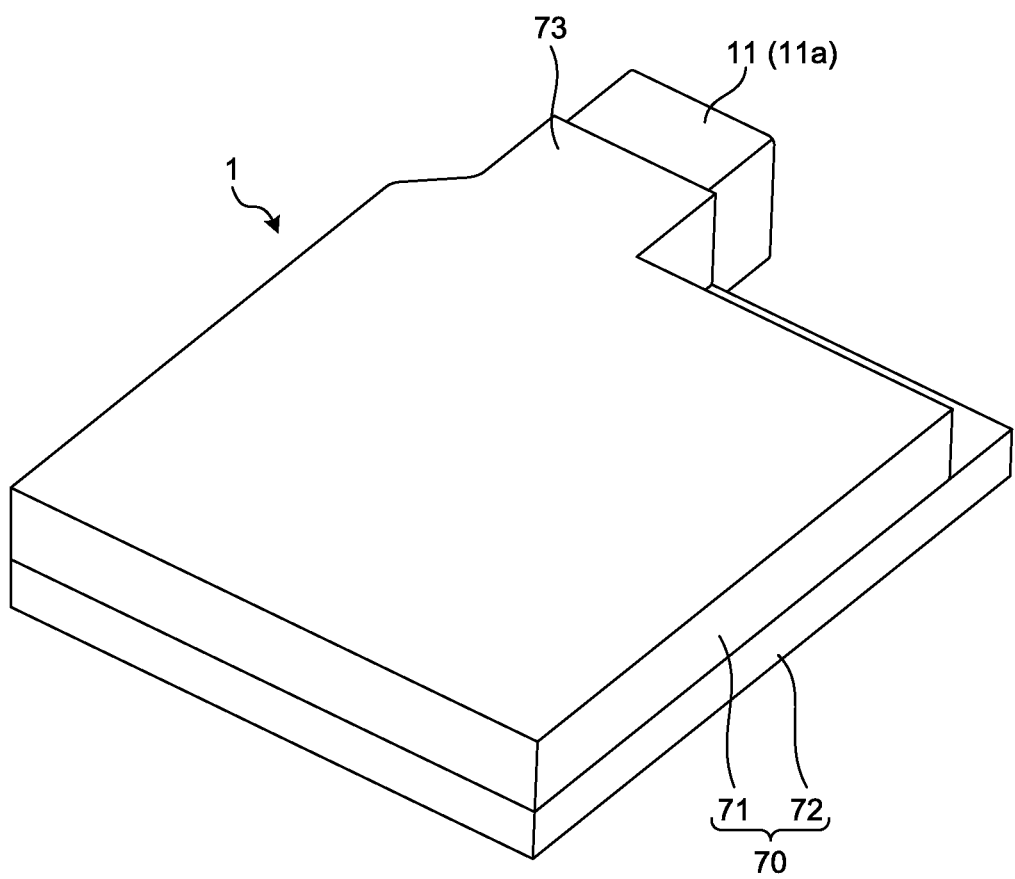
FIG. 1 is a perspective view of an exemplary configuration of a power transmission unit according to an embodiment.
Figure 2:
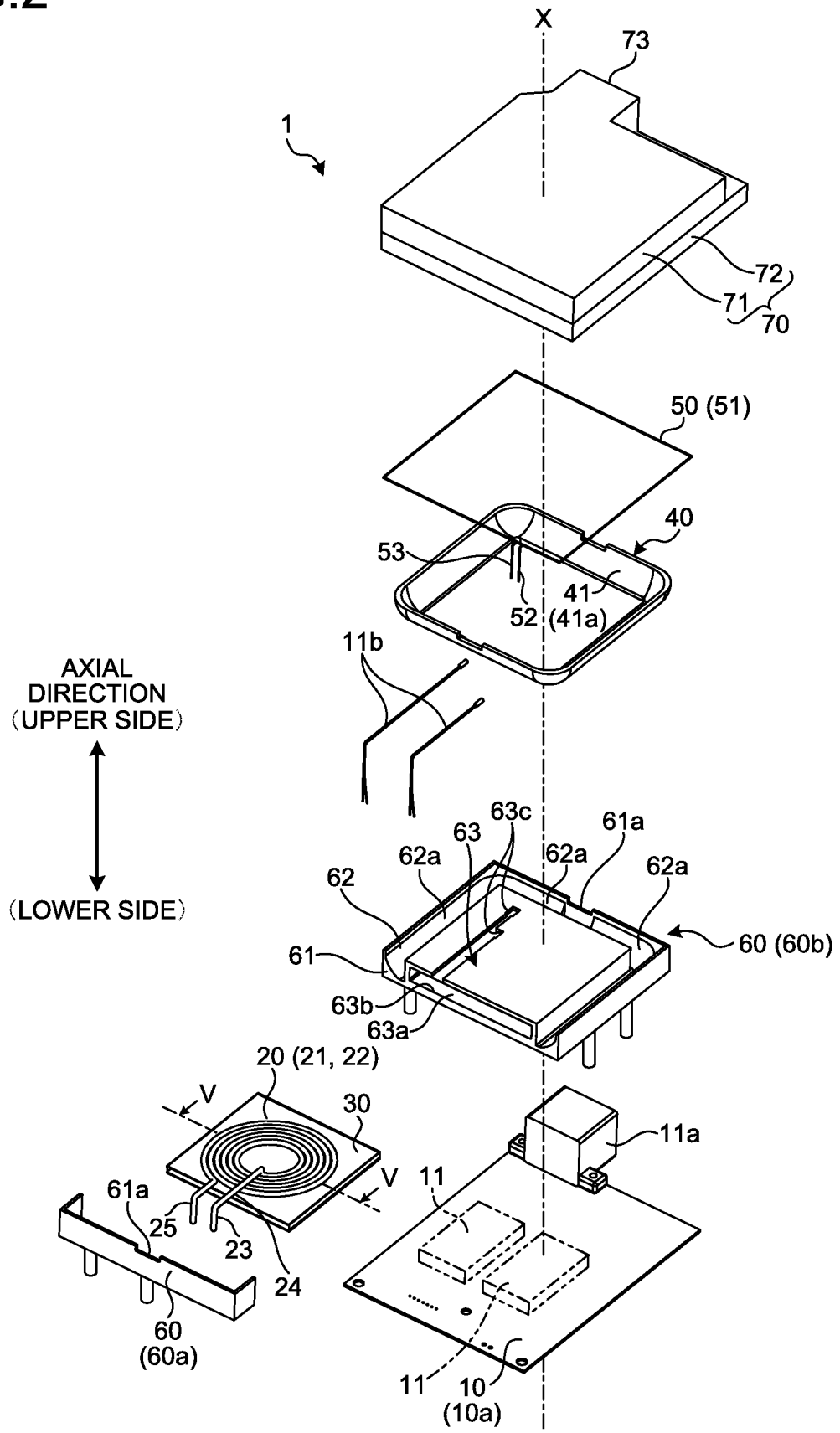
FIG. 2 is an exploded perspective view of the exemplary configuration of the power transmission unit according to the present embodiment.

As illustrated in FIGS. 1 and 2, the power transmission unit 1 includes a substrate 10, a power transmission coil 20, a ferrite member 30 as a magnetic member, a shield member 40, a communication coupler 50 as a communication unit, an inner case 60 as an inner member, and an outer case 70 as an outer member.

It is here noted that an axial direction extends along an axis X. The power transmission coil 20 is disposed on the upper side in the axial direction. The substrate 10 is disposed on the lower side in the axial direction. An intersecting direction extends to intersect the axial direction. An orthogonal direction is orthogonal to the axial direction.

The substrate 10 is what is called a printed circuit board 10 and constitutes an electronic circuit that electrically connects various types of electronic components 11 mounted thereon. Examples of the electronic components 11 include, but are not limited to, a resonant capacitor. The substrate 10 includes an insulating layer formed of an insulating material, such as epoxy resin, glass epoxy resin, paper epoxy resin, and ceramics, on which a wiring pattern (printed pattern) of copper foil or other conductive material is formed. The substrate 10 is electrically connected with the power transmission coil 20.

The power transmission coil 20 transmits electric power in a non-contact manner. The power transmission coil 20 and the resonant capacitor form an LC resonant circuit. For example, the power transmission coil 20 includes a winding 22, a winding starting end 23, an intermediate portion 24, and a winding terminating end 25. The winding 22 includes a conductor wire 21 wound about the axis X into a spiral form. The winding starting end 23 is an end of the conductor wire 21 at which winding starts. The intermediate portion 24 is a portion between the winding starting end 23 and the winding 22. The winding terminating end 25 is an end of the conductor wire 21 at which the winding ends. The conductor wire 21 is, for example, a litz wire that includes a plurality of conductor strands twisted together. The winding 22 represents a portion of the conductor wire 21 wound a plurality of turns from the inside to the outside along the intersecting direction that intersects the axial direction into a spiral form. Typically, the winding 22 is wound a plurality of times from the inside to the outside along the orthogonal direction that is orthogonal to the axial direction. The intermediate portion 24 represents a portion of the conductor wire 21 extending transversely from the inside to the outside of the winding 22. The intermediate portion 24 is compressed along the axial direction and fixed to the winding 22 by an adhesive. The winding starting end 23 and the winding terminating end 25 are disposed outside the winding 22 as viewed from the axial direction. The winding starting end 23 and the winding terminating end 25 are connected with the substrate 10.

Figure 3:
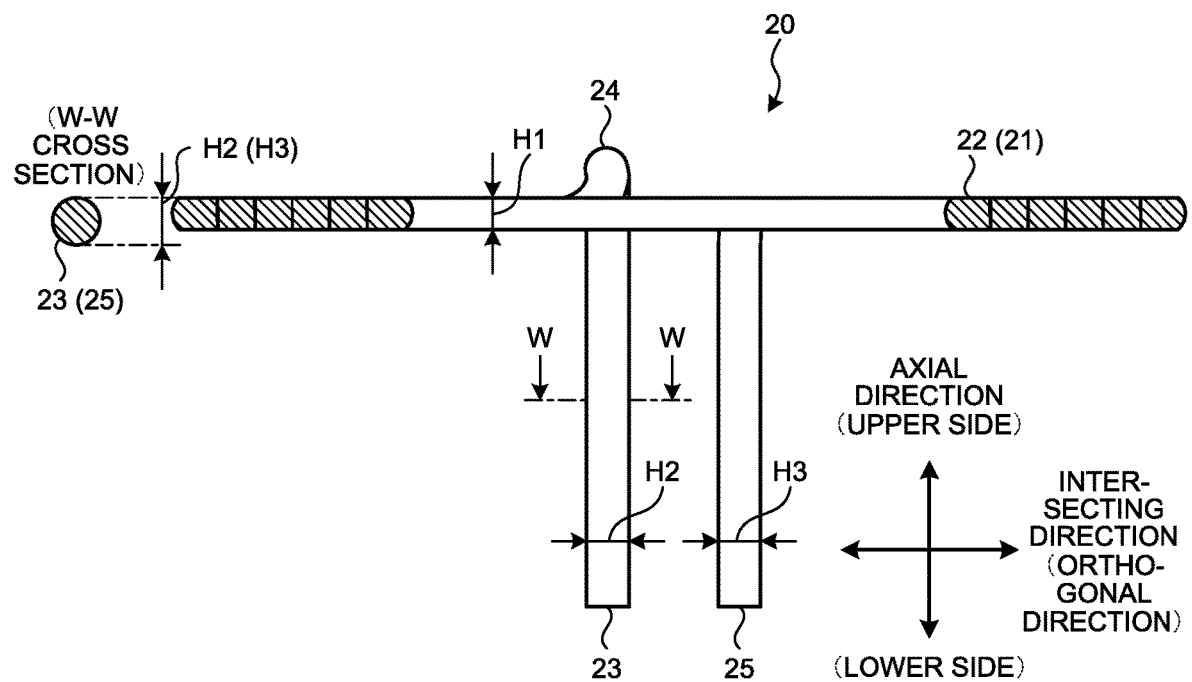
FIG. 3 is a cross-sectional view illustrating the exemplary configuration of a power transmission coil according to the present embodiment, taken along line V-V in FIG. 2.

As illustrated in FIG. 3, the winding 22 is the conductor wire 21 compressed along the axial direction and coated and fixed by an adhesive. This arrangement results in the conductor wire 21 in the winding 22 having a cross section deformed and being formed into a plate shape with spaces between adjacent conductor wires 21 closed. As a result, the power transmission coil 20 is formed such that a thickness H1 in the axial direction of the winding 22 is thinner than an outside diameter H2 of the winding starting end 23 (e.g., W-W cross section) and an outside diameter H3 of the winding terminating end 25. The foregoing arrangement enables the power transmission coil 20 to reduce variation in a coil shape and to minimize tolerance of an inductance value. Thus, the power transmission coil 20 can reduce variation in coil performance to thereby achieve appropriate coil performance. It is noted that the power transmission coil 20 is formed of a single conductor wire 21 wound into shape, so that the outside diameter H2 of the winding starting end 23 has a thickness equivalent to a thickness of the outside diameter H3 of the winding terminating end 25.

The ferrite member 30 contains a magnetic material. The ferrite member 30 is formed of, for example, a complex oxide composed of ferric oxide combined with a metal. The ferrite member 30 is formed into, for example, a rectangular plate shape having a size equal to a size of the power transmission coil 20. The ferrite member 30 is disposed to face the power transmission coil 20 along the axial direction. The ferrite member 30 passes a magnetic force generated by the power transmission coil 20 to thereby prevent loss of the magnetic force.

Figure 4:
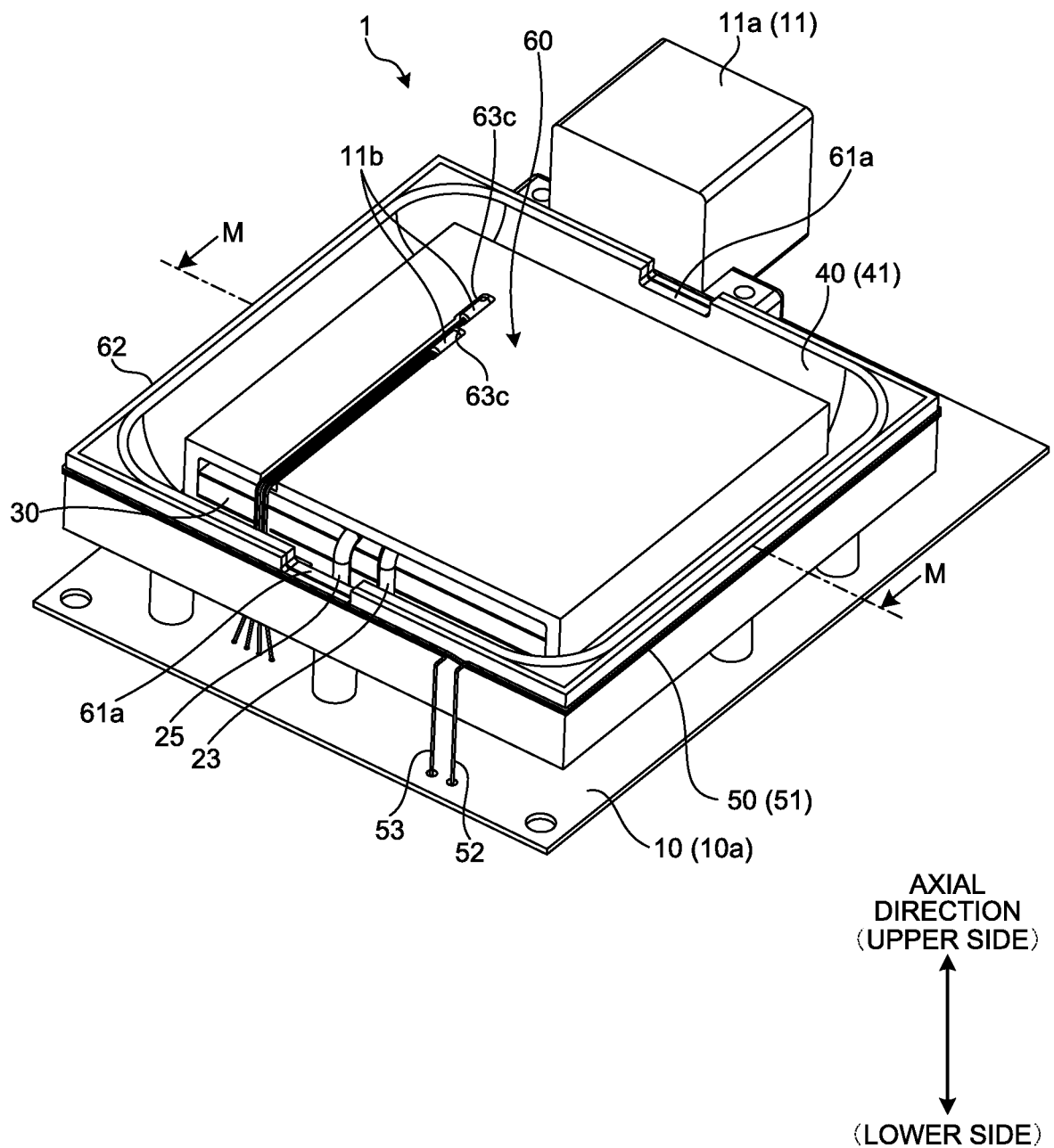
FIG. 4 is a perspective view of the exemplary configuration of the power transmission unit according to the present embodiment from which an outer case has been removed.
Figure 5:
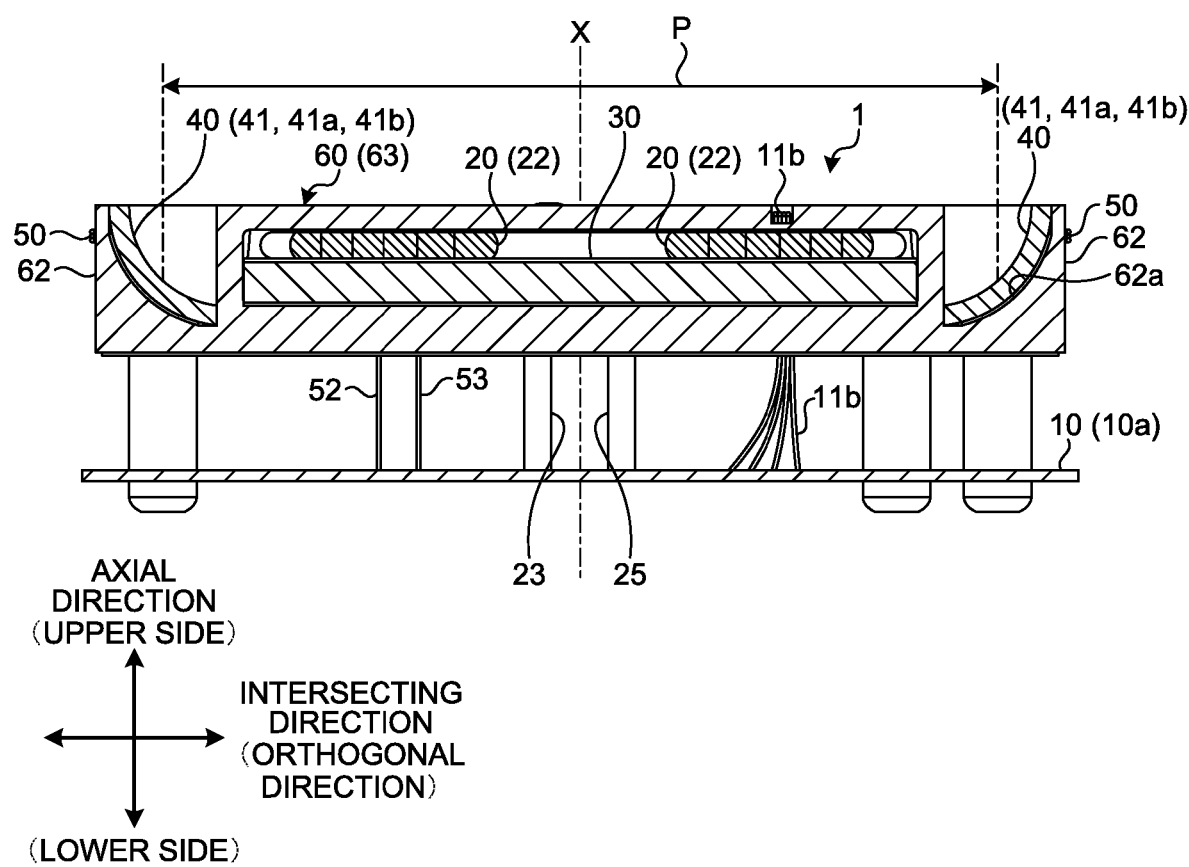
FIG. 5 is a cross-sectional view illustrating the power transmission unit according to the present embodiment, taken along line M-M in FIG. 4.

The shield member 40 shields an excess magnetic force (leakage magnetic field) of the power transmission coil 20 that can cause, for example, noise. The shield member 40 is formed of, for example, a metal having high electric conductivity, such as copper and aluminum. The shield member 40 includes a shielding wall 41. The shielding wall 41 is formed annularly about the axis X and has both axial ends open. The shielding wall 41 is formed of, for example, long plate member wound one turn about the axis X. The shielding wall 41 is formed into a substantially rectangular shape when viewed from the axial direction and have four rounded corners. As illustrated in FIGS. 4 and 5, for example, the shielding wall 41 is disposed so as to surround the power transmission coil 20 and the ferrite member 30 at a position extending along the intersecting direction. Specifically, the shielding wall 41 is disposed outside the power transmission coil 20 and the ferrite member 30 so as to surround the power transmission coil 20 and the ferrite member 30 and, when viewed from the intersecting direction, so as to overlap the power transmission coil 20 and the ferrite member 30.

Figure 6:
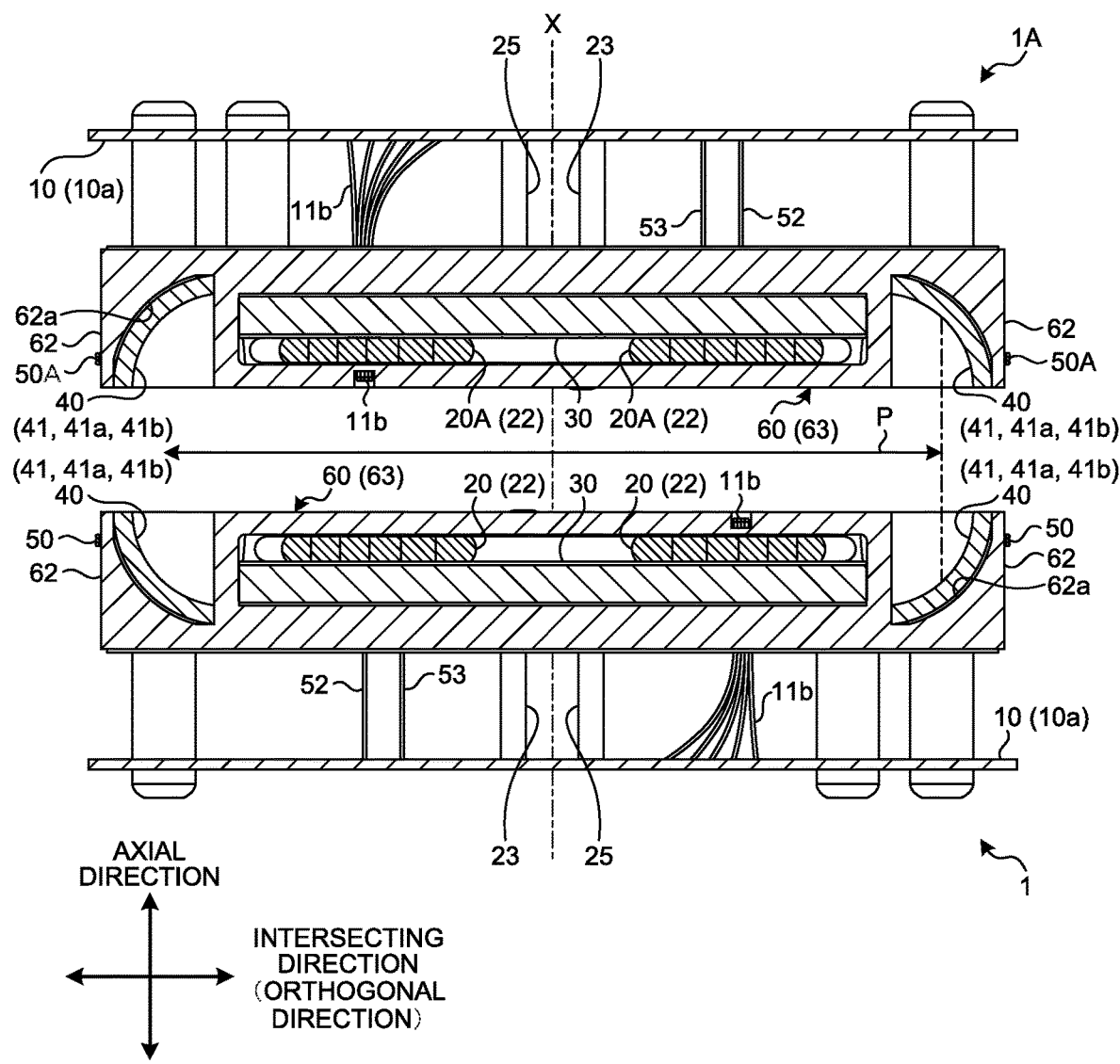
FIG. 6 is a cross-sectional view of the power transmission unit on a power transmission side and on a power reception side according to the present embodiment.

The shielding wall 41 is flared toward a counterpart side power transmission coil 20A. Specifically, the shielding wall 41 has wall faces 41a. The wall faces 41a face each other in the intersecting direction. The shielding wall 41 is formed such that a distance P between the wall faces 41a facing each other in the intersecting direction is wider at a longer distance from a first side (lower side) toward a second side (upper side) in the axial direction (see FIGS. 5 and 6). The foregoing arrangement allows the shielding wall 41 to prevent magnetic field lines (flux lines) of the power transmission coil 20 from being orthogonal to the shielding wall 41. Thus, the shielding wall 41 can prevent an eddy current that generates a magnetic field cancelling variation in the magnetic field by the power transmission coil 20 from flowing and thus can prevent reduction in power transmission efficiency. Additionally, the shielding wall 41 has a cut portion 41b. The cut portion 41b has been cut along the axial direction and is formed into an arc curved outwardly of the shielding wall 41. This arrangement allows the shielding wall 41 to further prevent the eddy current from flowing.

The communication coupler 50 is an antenna that transmits and receives signals. The communication coupler 50 is formed annularly about the axis X. The communication coupler 50, for example, includes an antenna wire 51. The antenna wire 51 is wound a plurality of (e.g., three) times about the axis X into a spiral form. The communication coupler 50 has a first end 52 and a second end 53. The first end 52 is an end of the antenna wire 51 at which the winding starts. The second end 53 is an end of the antenna wire 51 at which the winding ends. The first end 52 and the second end 53 are connected with the substrate 10. The communication coupler 50 is formed into a substantially rectangular shape when viewed from the axial direction. The communication coupler 50 is disposed so as to surround the power transmission coil 20 at a position extending along the intersecting direction. Specifically, the communication coupler 50 is disposed outside the power transmission coil 20 so as to surround the power transmission coil 20. The shield member 40 is disposed between the communication coupler 50 and the power transmission coil 20 in the intersecting direction. The foregoing arrangement allows the shield member 40 to prevent the magnetic force of the power transmission coil 20 from affecting the communication coupler 50. The communication coupler 50 can thus prevent characteristics from being changed to thereby reduce loss of signals. The communication coupler 50 thus can prevent communication quality from being degraded.

The inner case 60 is housed inside the outer case 70. The inner case 60 is formed of, for example, an insulating synthetic resin and molded by a well-known injection molding technique. The inner case 60 defines relative positions of the substrate 10, the power transmission coil 20, and the ferrite member 30 in a manner of being capable of transmitting electric power to the counterpart side power transmission coil 20A. Additionally, the inner case 60 defines relative positions of the shield member 40 and the communication coupler 50 in a manner of being capable of communicating with a counterpart side communication coupler 50A. The substrate 10, the power transmission coil 20, the ferrite member 30, the shield member 40, and the communication coupler 50 are assembled on the inner case 60. The assembling allows the power transmission unit 1 to house the inner case 60, in which components including the substrate 10, the power transmission coil 20, the ferrite member 30, the shield member 40, and the communication coupler 50 are positioned and assembled, in the outer case 70. The foregoing arrangements enable the power transmission unit 1 to easily and accurately define relative positions of the components and to easily hold the components, as compared with, for example, a configuration in which the components are directly assembled inside the outer case 70. Thus, the power transmission unit 1 can accurately define relative positions with respect to the components in a counterpart side power transmission unit 1A.

The inner case 60 includes a support plate 61, an upright wall 62, and a housing chamber 63. The support plate 61 is disposed so as to intersect the axis X. The upright wall 62 is erected from the support plate 61 and extends annularly about the axis X. When viewed from the axial direction, the upright wall 62 is formed into a substantially rectangular shape. The upright wall 62 has an outer peripheral shape identical to an inner peripheral shape of the communication coupler 50. For example, the communication coupler 50 may be wound around an outer surface of the upright wall 62 to thereby be mounted on the upright wall 62. The upright wall 62 has an inner peripheral shape identical to an outer peripheral shape of the shield member 40. The upright wall 62 includes a curved support portion 62a on the inside thereof. The support portion 62a supports an outer surface of the shield member 40. The shield member 40 is supported by the support portion 62a to thereby be mounted in the upright wall 62. The shield member 40 is affixed to the support portion 62a using, for example, adhesive tape (not illustrated), so that the shield member 40 can be mounted in the upright wall 62. The upright wall 62 has a cutout 61a in an edge thereof on the upper side in the axial direction. The cutout 61a is formed by cutting part of the edge of the upright wall 62 on the upper side in the axial direction. The cutout 61a allows a potting material or a molding material to readily flow into the inside of the inner case 60.

The housing chamber 63 is formed into a cuboid shape and disposed inside the upright wall 62. The housing chamber 63 includes a space 63a, an insertion port 63b, and a mounting portion 63c. The space 63a houses the power transmission coil 20. The insertion port 63b is a port via which the power transmission coil 20 is inserted into the space 63a. The mounting portion 63c is a portion on which a thermistor for measuring temperature of the power transmission coil 20 and detecting a foreign object (e.g., foreign metal) present in the outer case 70 is mounted. In the housing chamber 63, the power transmission coil 20 is inserted via the insertion port 63b into the space 63a and the inserted power transmission coil 20 is thereby housed in the space 63a. In the housing chamber 63, the thermistor that measures the temperature of the power transmission coil 20 housed in the space 63a and detects a foreign object present in the outer case 70 is mounted on the mounting portion 63c. It is noted that the inner case 60 is configured such that, in order for the power transmission coil 20 to be inserted via the insertion port 63b into the space 63a, a section 60a of the inner case 60 on the side of the insertion port 63b can be separated from a main body 60b of the inner case 60.

The outer case 70 is a housing that covers the inner case 60. The outer case 70 is formed of, for example, an insulating synthetic resin and molded by a well-known injection molding technique. For example, the outer case 70 includes an upper case 71 and a lower case 72. The upper case 71 is disposed on the upper side in the axial direction. The lower case 72 is disposed on the lower side in the axial direction. The outer case 70 is formed into a box shape by the upper case 71 being assembled with the lower case 72 in the axial direction. The outer case 70 has a connector opening 73. A connector connection 11a disposed on the substrate 10 is exposed through the connector opening 73. The upper case 71 and the lower case 72 of the outer case 70 generally cover the inner case 60 on which the substrate 10, the power transmission coil 20, the ferrite member 30, the shield member 40, and the communication coupler 50 have been assembled.

As described above, the shield member 40 and the power transmission unit 1 according to the present embodiment include the shielding wall 41. The shielding wall 41 shields a magnetic force generated by the power transmission coil 20 that is formed annularly about the axis X and disposed inside the shield member 40. The shielding wall 41 is formed such that the distance P between the wall faces 41a facing each other in the intersecting direction is wider at a longer distance from the first side toward the second side in the axial direction. The foregoing arrangements allow the shield member 40 and the power transmission unit 1 to prevent the magnetic field lines of the power transmission coil 20 from being orthogonal to the wall faces 41a of the shielding wall 41. Thus, the shield member 40 and the power transmission unit 1 can prevent an eddy current from occurring and prevent the power transmission efficiency from being reduced.

Figure 7:
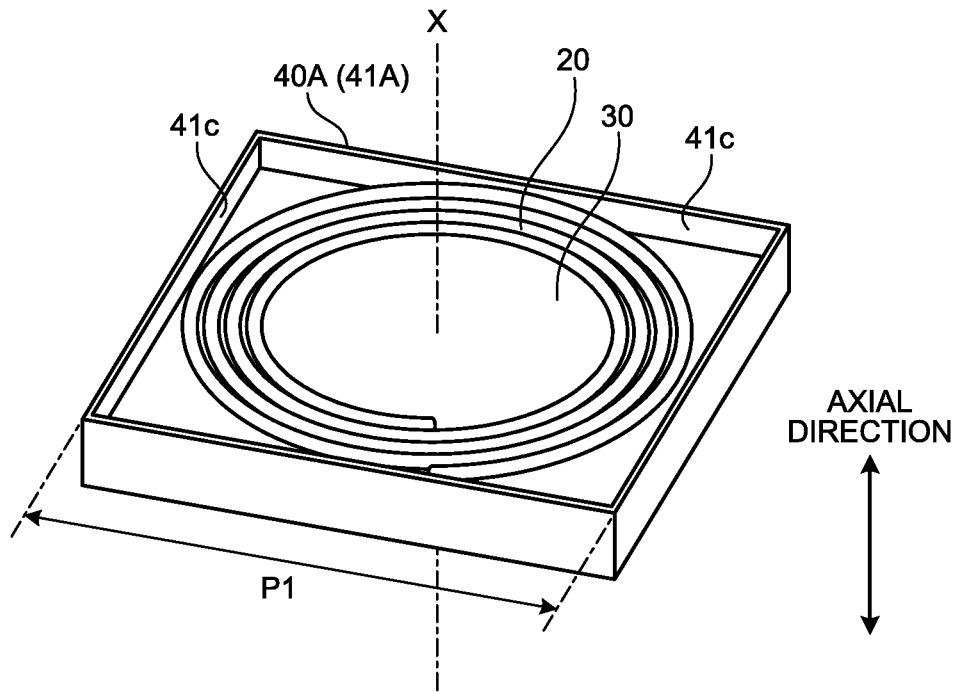
FIG. 7 is a perspective view of an exemplary configuration of a shield member according to a comparative example.
Figure 8:
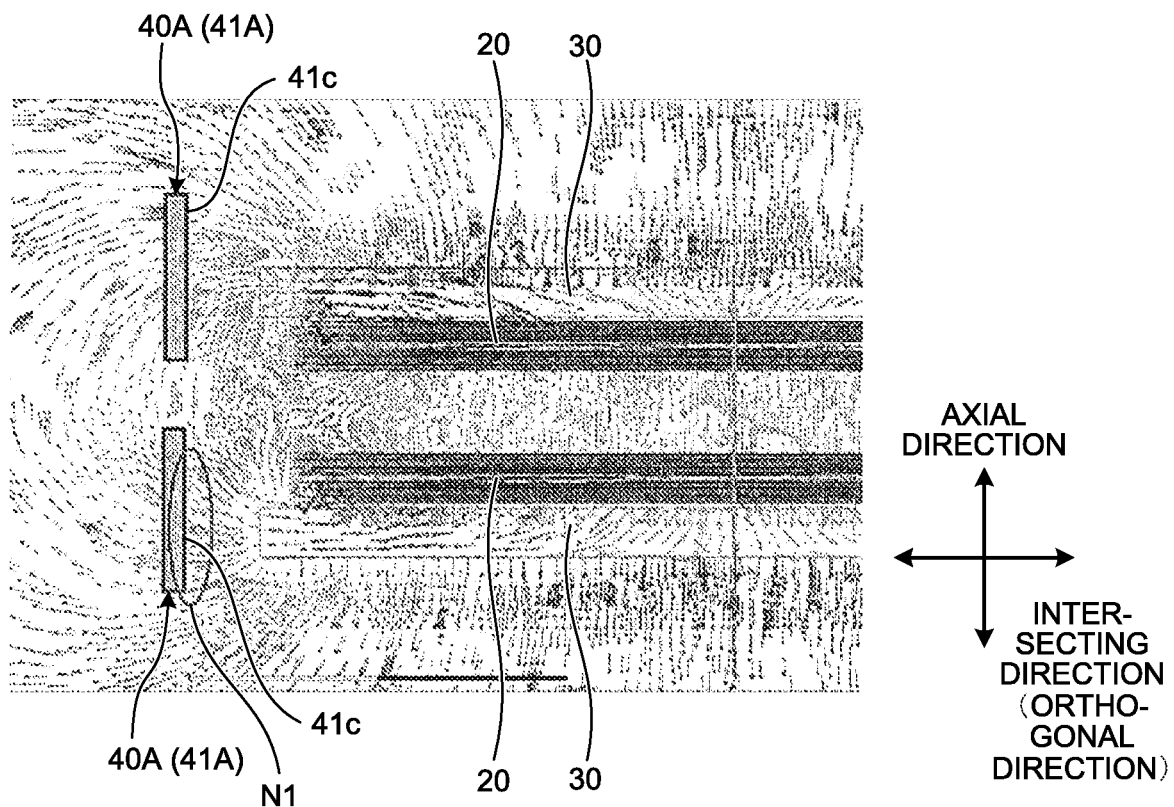
FIG. 8 is a diagram illustrating an operation of the shield member in the comparative example.
Figures 9, 10:
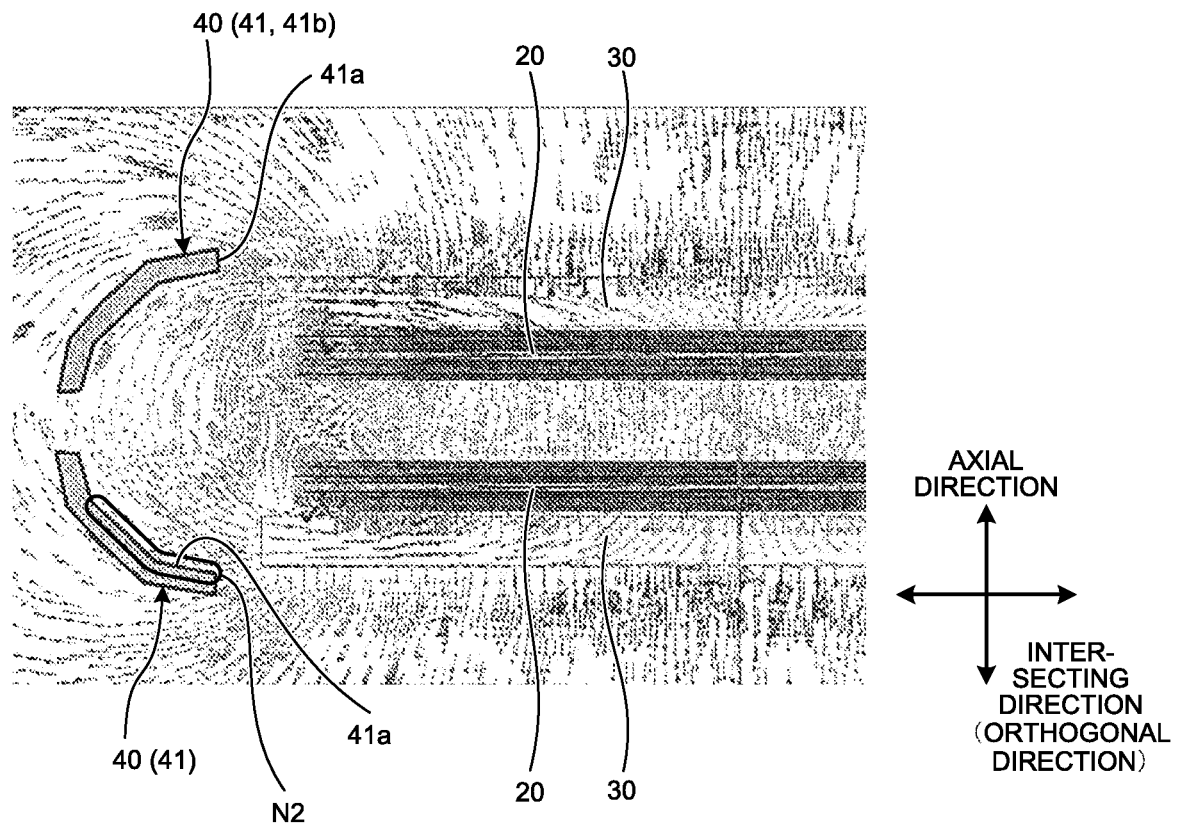
FIG. 9 is a diagram illustrating an operation of the shield member according to the present embodiment.
FIG. 10 is a chart depicting shielding performance of the shield member according to the present embodiment and the comparative example.

The following compares the shield member 40 according to the present embodiment with a shield member 40A in a comparative example in terms of shielding performance. As illustrated in FIG. 7, for example, the shield member 40A in the comparative example includes a shielding wall 41A. The shielding wall 41A is formed annularly about the axis X. The shielding wall 41A is formed into a rectangular shape when viewed from the axial direction. The shielding wall 41A is formed such that a distance P1 between wall faces 41c facing each other in the intersecting direction remains equal from a first side toward a second side in the axial direction. Thus, as illustrated in FIG. 8, the magnetic field lines (flux lines) of the power transmission coil 20 very often extend relatively orthogonally in a zone N1 of the shielding wall 41A, for example. In contrast, the shielding wall 41 according to the present embodiment is formed such that the distance P between the wall faces 41a is wider toward the side of the counterpart side power transmission coil 20A and the shielding wall 41 is arcuately formed. As a result, as illustrated in FIG. 9, the shielding wall 41 according to the present embodiment can prevent the magnetic field lines of the power transmission coil 20 from being orthogonal in a zone N2 as compared with the shielding wall 41A, for example. Specifically, the shielding wall 41, because being arcuately formed so as to extend along the magnetic field lines of the power transmission coil 20, can prevent the magnetic field lines from being orthogonal.

FIG. 10 is a chart depicting shielding performance of the shield member 40 according to the present embodiment and the shield member 40A in the comparative example. The shield member 40 according to the present embodiment is formed such that the distance in the intersecting direction is wider at a longer distance from the opening on the first end side toward the opening on the second end side. The shield member 40A in the comparative example is formed such that the distance in the intersecting direction remains equal from the opening on the first end side toward the opening on the second end side. As illustrated in FIG. 10, the shield member 40 according to the present embodiment records smaller shielding loss [W] as loss involved in the shielding of the magnetic force and thus achieves higher power transmission efficiency than the shield member 40A in the comparative example does. The shield member 40 according to the present embodiment has lower intensity of a radiated magnetic field in the orthogonal direction and the axial direction and thus achieves a higher shielding effect than the shield member 40A in the comparative example does. The shield member 40 according to the present embodiment has a higher inductance L and a smaller resistance R than the shield member 40A in the comparative example does, so that a Q value that indicates a ratio of the inductance L to the resistance R becomes greater and the power transmission efficiency is higher. The shield member 40 according to the present embodiment does not obstruct the magnetic force for power transmission, so that the shield member 40 according to the present embodiment achieves a higher coupling coefficient k to achieve higher power transmission efficiency than the shield member 40A in the comparative example does. Thus, the shield member 40 and the power transmission unit 1 can prevent reduction in the power transmission efficiency through a simple configuration without the need to add additional parts. Additionally, the shield member 40 and the power transmission unit 1, because of the shield member 40 not being spaced apart from the power transmission coil 20 in the intersecting direction, can prevent the unit from becoming large in size. Additionally, in the shield member 40 and the power transmission unit 1, because the openings on both sides in the axial direction are open, reduction can be achieved in the amount of material used for the shield member 40, so that reduction in weight and cost can be achieved. Additionally, in the shield member 40 and the power transmission unit 1, the eddy current does not readily occur and thus reduction can be achieved in heat generated by the shield member 40.

Furthermore, in the shield member 40, the shielding wall 41 has an arcuate cross-sectional shape (cut portion 41b) along the axial direction. This arrangement allows the shielding wall 41 to further prevent the eddy current from flowing, because the magnetic field lines of the power transmission coil 20 extend to follow the arcuate shape of the cut portion 41b.

Modifications

Figure 11:
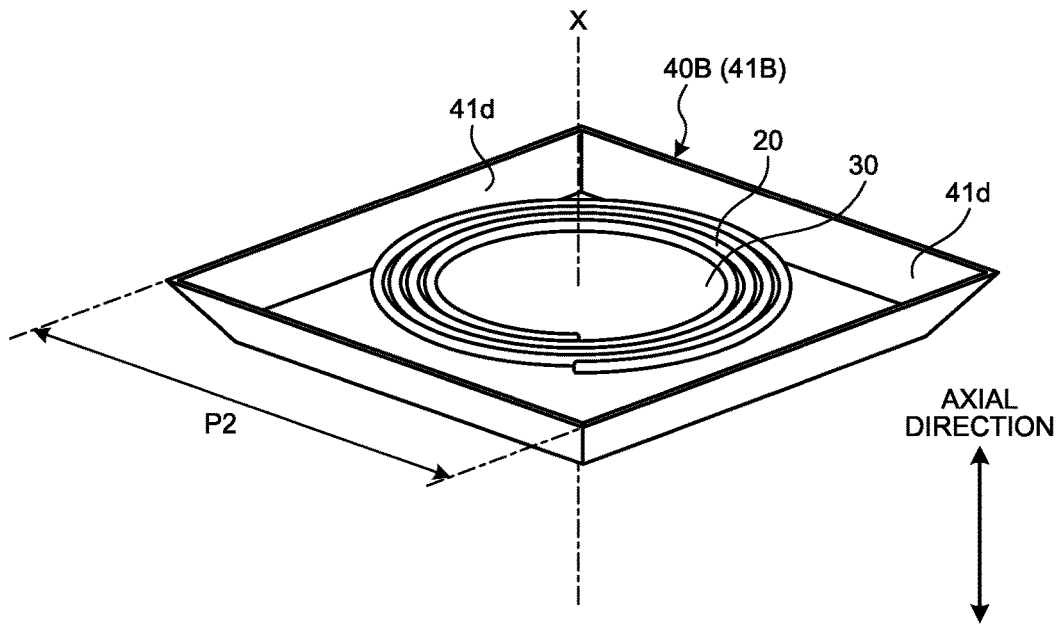
FIG. 11 is a perspective view of an exemplary configuration of a shield member according to a modification.
Figure 12:
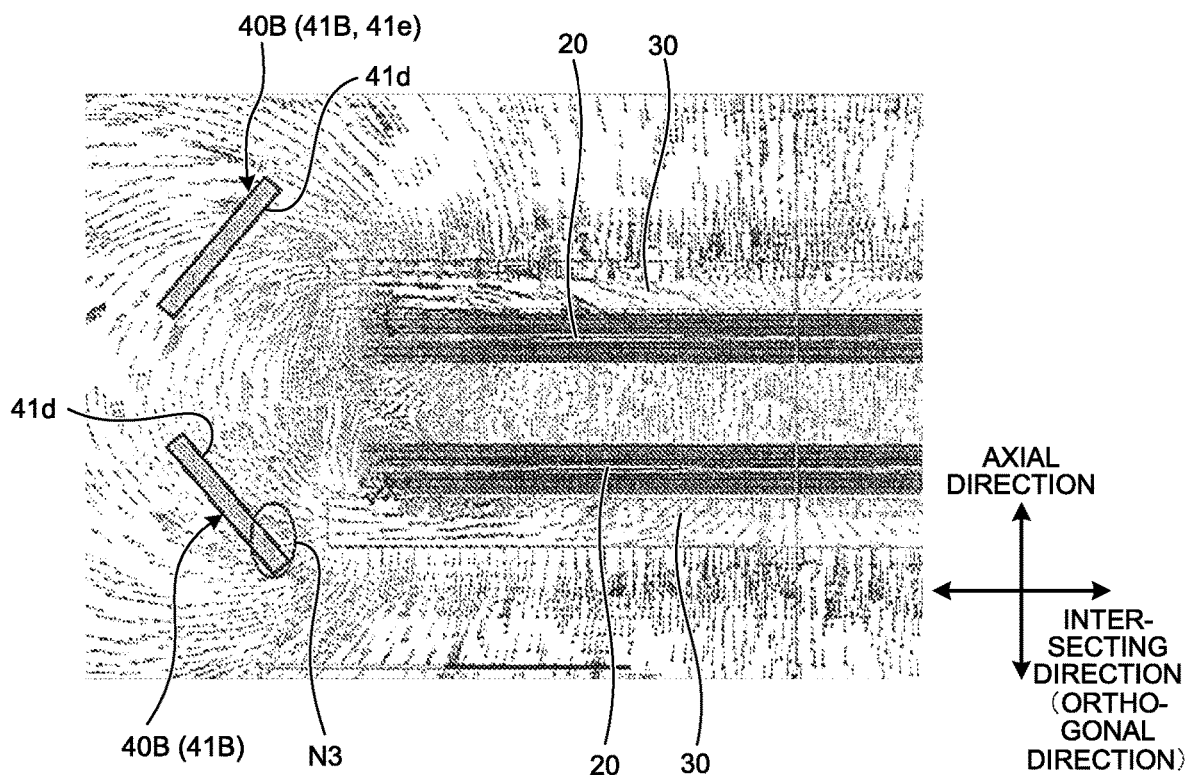
FIG. 12 is a diagram illustrating an operation of the shield member in the modification.

The following describes modifications of the embodiment. The shield member 40, which has been described for an exemplary arrangement of having an arcuate cross-sectional shape (cut portion 41b) along the axial direction, is illustrative only and not limiting. For example, a shield member 40B is formed such that a distance P2 between wall faces 41d facing each other in the intersecting direction is wider at a longer distance from a first side toward a second side (the side of the counterpart side power transmission coil 20A) in the axial direction. Additionally, a shielding wall 41B is formed to have a rectangular cross-sectional shape (cut portion 41e) (see FIGS. 11 and 12). The foregoing arrangements allow the shield member 40B to prevent, as illustrated in FIG. 12, the magnetic field lines of the power transmission coil 20 from being orthogonal in a zone N3 as compared with the shielding wall 41A in the comparative example, for example. Specifically, the shielding wall 41B, because being formed into a rectangular shape to follow the magnetic field lines of the power transmission coil 20, can prevent the magnetic field lines from being orthogonal. Thus, the shield member 40B can prevent the eddy current from occurring and prevent reduction in the power transmission efficiency.

FIG. 13 is a chart depicting shielding performance of the shield member 40B in the modification. The shield member 40B in the modification is formed such that the distance in the intersecting direction is wider at a longer distance from the opening on the first end side toward the opening on the second end side. As illustrated in FIG. 13, the shield member 40B in the modification records smaller shielding loss [W] as the loss involved in the shielding of the magnetic force and thus achieves higher power transmission efficiency than the shield member 40A in the comparative example does. The shield member 40B in the modification has lower intensity of the radiated magnetic field in the orthogonal direction and the axial direction and thus achieves a higher shielding effect than the shield member 40A in the comparative example does. The shield member 40B in the modification has a higher inductance L and a smaller resistance R than the shield member 40A in the comparative example does, so that the Q value that indicates the ratio of the inductance L to the resistance R becomes greater and the power transmission efficiency is higher. The shield member 40B in the modification does not obstruct the magnetic force for power transmission, so that the shield member 40B in the modification achieves a higher coupling coefficient k to achieve higher power transmission efficiency than the shield member 40A in the comparative example does.

The substrate 10 has been described as being a printed circuit board, which is nonetheless illustrative only and not limiting. The substrate 10 may, for example, be an insert bus bar substrate including an insulating resin in which an electrically conductive metal bus bar is incorporated to form various circuits.

The power transmission coil 20 formed into a spiral form is illustrative only and not limiting. The power transmission coil 20 may, for example, be what is called a solenoid type. Specifically, the power transmission coil 20 may be wound around a ferrite not illustrated into a spiral form. In this case, the solenoid-type power transmission coil is disposed such that a coil axial direction extends to intersect (e.g., orthogonal to) the axis X.

The power transmission coil 20 has been described so that the winding 22 is compressed and coated by an adhesive. This arrangement is illustrative only and not limiting. The power transmission coil 20 may include the winding 22 that is not compressed or coated by an adhesive.

The ferrite member 30, which has been described as being formed into a rectangular plate, is illustrative only and not limiting. The ferrite member 30 may be formed, for example, into a circular plate. Alternatively, a plurality of small block-shaped ferrite parts may be formed into a single ferrite part.

The shield members 40 and 40B, which have been described as having the open openings on both sides in the axial direction, are illustrative only and not limiting. For example, the shield members 40 and 40B may each have an end on the ferrite member 30 side in the axial direction closed.

The outer case 70, which has been described as being formed into a box shape to completely cover the inner case 60, is illustrative only and not limiting. For example, the outer case 70 may be disposed so as to cover, from the upper side in the axial direction, the inner case 60 under a condition in which the inner case 60 on which components are assembled is disposed on a placement surface.

The inner case 60, which has been described as having the substrate 10, the power transmission coil 20, the ferrite member 30, the shield member 40, and the communication coupler 50 assembled thereon using, for example, adhesive tape, is illustrative only and not limiting. The components including the substrate 10, the power transmission coil 20, the ferrite member 30, the shield member 40, and the communication coupler 50 may be assembled on the inner case 60 through, for example, insert molding. In this case, as compared with an arrangement in which the components are directly assembled on an outer case not illustrated through insert molding, the inner case 60 can simplify a mold to be employed in the insert molding. This feature enables the power transmission unit 1 to reduce manufacturing cost.

The substrate 10 is assembled on the inner case 60 on the side opposite to the upright wall 62 of the support plate 61 via a plurality of spacers (not illustrated). The spacers prevent the inner case 60 from interfering with the electronic components 11 on the substrate 10. The spacers are disposed in a standing condition on a mounting surface 10a of the substrate 10. The inner case 60 has bolt fastening holes (not illustrated) at ends thereof. The support plate 61 of the inner case 60 has a plurality of bolt insertion holes (not illustrated). The bolt insertion holes are aligned with the respective bolt fastening holes in the respective spacers. In the inner case 60, a plurality of bolts (not illustrated) are passed through the respective bolt insertion holes and these bolts are fastened with the respective bolt fastening holes. This step causes the substrate 10 to be assembled with the inner case 60. In the embodiment, the support plate 61 of the inner case 60 is assembled with the substrate 10.

The shield member and the power transmission unit according to the present embodiment each include the shielding wall. The shielding wall is formed annularly about the axis and shields the magnetic force generated by the power transmission coil disposed thereinside. The shielding wall is formed such that the distance between the wall faces facing each other in the intersecting direction is wider at a longer distance from the first side in the axial direction extending along the axis toward the second side in the axial direction. The foregoing arrangements allow the shield member and the power transmission unit to prevent the magnetic field lines of the power transmission coil from being orthogonal to the shielding wall. As a result, the shield member and the power transmission unit can prevent the eddy current from occurring and prevent reduction in the power transmission efficiency.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A shield member comprising:
a shielding wall that is formed annularly around a longitudinal axis, and shields a magnetic force generated by a power transmission coil disposed inside the shielding wall, wherein
the shielding wall includes wall faces facing each other in an intersecting direction that intersects the longitudinal axis,
the wall faces shield a magnetic force generated by the power transmission coil and are formed such that a distance between the wall faces on a first side of the shielding wall than a distance on a second side of the shielding wall in the longitudinal axis.

2. The shield member according to claim 1, wherein
the shielding wall is formed to have an arcuate cross-sectional shape along an axial direction extending along the longitudinal axis.

3. The shield member according to claim 1, wherein
the shielding wall is formed to have an arcuate cross-sectional shape along an axial direction extending along the longitudinal axis.

4. A power transmission unit, comprising:
a power transmission coil that transmits electric power to a counterpart side power transmission coil in a non-contact manner; and
a shield member that includes a shielding wall that is formed annularly around a longitudinal axis, and shields a magnetic force generated by the power transmission coil disposed inside the shielding wall, wherein
the shielding wall includes wall faces facing each other in an intersecting direction that intersects the longitudinal axis,
the wall faces shield a magnetic force generated by the power transmission coil and are formed such that a distance between the wall faces on a first side of the shielding wall than a distance on a second side of the shielding wall in the longitudinal axis.

5. The shield member according to claim 1, wherein
the shielding wall is fixed on a support plate in an inner case.

6. The power transmission unit according to claim 4, wherein
the shielding wall is fixed on a support plate in an inner case.

7. The shield member according to claim 1, wherein
the shielding wall has both ends open in an axial direction extending along the longitudinal axis.

8. The power transmission unit according to claim 4, wherein
the shielding wall has both ends open in an axial direction extending along the longitudinal axis.

* * * * *